US007704383B2

(12) United States Patent
Zulauf et al.

(10) Patent No.: US 7,704,383 B2

(45) Date of Patent: Apr. 27, 2010

(54) PORTABLE FUEL DESULFURIZATION UNIT

(75) Inventors: Gary B. Zulauf, Findlay, OH (US); Ronald P. Rohrbach, Flemington, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/252,911

(22) Filed: Oct. 16, 2008

(65) Prior Publication Data

US 2009/0095683 A1 Apr. 16, 2009

Related U.S. Application Data

(60) Provisional application No. 60/980,425, filed on Oct. 16, 2007.

(51) Int. Cl.
*B01D 21/24* (2006.01)

(52) U.S. Cl. ..................... 210/103; 210/143; 210/416.4

(58) Field of Classification Search ............. 210/416.4, 210/103, 143
See application file for complete search history.

(56) References Cited

U.S. PATENT DOCUMENTS 4,919,103 A 4/1990 Ishiguro et al.
5,094,747 A 3/1992 Johnson
5,454,933 A 10/1995 Savage et al.
5,460,136 A 10/1995 Yamazaki et al.
5,472,673 A 12/1995 Goto et al.
5,792,436 A 8/1998 Feeley et al.
5,853,436 A 12/1998 Cherpeck
5,997,593 A 12/1999 McDonnell et al.
6,080,212 A 6/2000 Beimesch et al.
6,129,835 A 10/2000 Lesieur et al.
6,187,939 B1 2/2001 Sasaki et al.
6,238,554 B1 * 5/2001 Martin et al. ............... 210/109
6,361,573 B1 3/2002 Henly
6,533,924 B1 3/2003 Lesieur et al.
6,562,086 B1 5/2003 Gentry et al.
6,609,534 B1 * 8/2003 Beaney et al. ............ 137/87.03

(Continued)

FOREIGN PATENT DOCUMENTS

DE 19845397 A1 10/1998

(Continued)

OTHER PUBLICATIONS

International Search Report of International Searching Authority dated Mar. 17, 2008—PCT/US07/80024.

(Continued)

*Primary Examiner*—Chester T Barry
(74) *Attorney, Agent, or Firm*—Cantor Colburn LLP

(57) ABSTRACT

A mobile fuel filter for removing sulfur-containing compounds from a diesel fuel is provided. The mobile fuel filter comprises: a filter median comprising an absorbent for removing sulfur-containing compounds from the diesel fuel, the filter median being in fluid communication with a storage device, the storage device having a holding capacity greater than 1000 gallons and being configured for storing the diesel fuel, the absorbent being configured to remove sulfur containing compounds from the diesel fuel to produce filtered diesel fuel having less than 15 ppm of sulfur containing compounds, the absorbent comprises an inorganic oxide having a surface acidity characterized by a $pK_a$ of at least −3.

22 Claims, 3 Drawing Sheets

U.S. PATENT DOCUMENTS

| | | | |
|---|---|---|---|
| 6,733,657 | B2 | 5/2004 | Benazzi et al. |
| 6,749,754 | B1 | 6/2004 | Holder et al. |
| 6,756,022 | B2 | 6/2004 | Sakai et al. |
| 6,835,218 | B1 * | 12/2004 | Drozd et al. .................. 44/459 |
| 6,887,381 | B2 | 5/2005 | Rohrbach et al. |
| 2001/0029311 | A1 | 10/2001 | Khare |
| 2001/0035006 | A1 | 11/2001 | Dou et al. |
| 2001/0047653 | A1 | 12/2001 | Mizuno et al. |
| 2002/0028505 | A1 * | 3/2002 | Sakai et al. .............. 435/299.1 |
| 2002/0103078 | A1 | 8/2002 | Hu et al. |
| 2002/0128146 | A1 | 9/2002 | Druckhammer et al. |
| 2002/0160911 | A1 | 10/2002 | Benazzi et al. |
| 2003/0070990 | A1 | 4/2003 | Rohrbach et al. |
| 2003/0113249 | A1 | 6/2003 | Hepburn et al. |
| 2004/0063576 | A1 | 4/2004 | Weston et al. |
| 2004/0065003 | A1 | 4/2004 | O'Rear |
| 2004/0091753 | A1 | 5/2004 | Terorde et al. |
| 2004/0118749 | A1 | 6/2004 | Leseman et al. |
| 2004/0232047 | A1 | 11/2004 | Benazzi et al. |
| 2005/0016927 | A1 | 1/2005 | Rohrbach et al. |
| 2005/0169826 | A1 | 8/2005 | Li et al. |
| 2005/0217638 | A1 * | 10/2005 | Kaneko ...................... 123/294 |
| 2005/0236334 | A1 | 10/2005 | Rohrbach et al. |
| 2006/0065584 | A1 | 3/2006 | Hacker et al. |
| 2006/0144761 | A1 | 7/2006 | Keckler et al. |
| 2006/0201145 | A1 | 9/2006 | Brady |
| 2006/0218904 | A1 | 10/2006 | Brady |
| 2007/0189939 | A1 | 8/2007 | Rohrbach et al. |
| 2009/0293725 | A1 * | 12/2009 | Rood et al. ................... 96/112 |

FOREIGN PATENT DOCUMENTS

| | | | |
|---|---|---|---|
| EP | 1550505 | A1 | 6/2005 |
| WO | WO0020531 | A1 | 4/2000 |
| WO | WO0132304 | A1 | 10/2001 |
| WO | WO2004022224 | A1 | 3/2004 |
| WO | WO2005007780 | A2 | 1/2005 |

OTHER PUBLICATIONS

Written Opinion of International Searching Authority dated Mar. 17, 2008—PCT/US07/80024.

International Search Report of International Searching Authority dated Feb. 14, 2007—PCT/US07/003891.

Written Opinion of International Searching Authority dated Feb. 14, 2007—PCT/US07/003891.

International Search Report of International Searching Authority dated Aug. 26, 2005—PCT/US05/008654.

Written Opinion of International Searching Authority dated Aug. 26, 2005—PCT/US05/008654.

* cited by examiner

PORTABLE FUEL DESULFURIZATION UNIT

CROSS REFERENCE TO RELATED APPLICATIONS

This application claims the benefit of U.S. Provisional Patent Application Ser. No. 60/980,425, filed Oct. 16, 2007 the contents of which are incorporated herein by reference thereto.

This application is also related to U.S. patent application Ser. No. 11/864,962, filed Sep. 29, 2006; U.S. patent application Ser. No., 11/081,796, filed Mar. 15, 2005, now U.S. Pat. No. 7,410,585; and U.S. patent application Ser. No., 11/674,913, filed Feb. 14, 2007, now U.S. Pat. No. 7,575,688, the contents each of which are incorporated herein by reference thereto.

Embodiments of this invention may have been made with governmental support under Contract No. DE-PS26-00NT40758. Therefore, the U.S. Government may have a paid-up license to portions or embodiments of this invention and the right in limited circumstances to require the patent owner to license to others on reasonable terms as provided for by the terms of, Contract No. DE-PS26-00NT40758.

BACKGROUND

Exemplary embodiments of the present invention relate to a mobile fuel filter and method for the removal of sulfur containing compounds from a diesel fuel. More particularly, exemplary embodiments relate to a mobile fuel filter and method for the removal of sulfur containing compounds that provide for the production of fuel streams having concentrations of sulfur containing compound of less than 15 ppm.

There continues to be environmental concern relating to air pollution stemming from use of internal combustion engines, especially those used in transportation applications such as cars, trucks, boats and the like, and stationary power sources such as diesel generators and the like. In addition to being a direct source of pollution in the form of $SO_x$, sulfur also poisons the catalytic surface of exhaust after treatment devices. By reducing sulfur in the fuel and therefore the exhaust, the useful life of exhaust after treatment devices is extended.

New power sources such as fuel cells will also require fuel streams to have similar or lower levels of sulfur. Fuel cells burn hydrogen that has been reformed from various hydrocarbon fuels, such as gasoline. Sulfur will poison the active surfaces of the fuel cell, thus shortening its life.

As a result, various governments and regulatory bodies continue to enact legislation intended to substantially lower the acceptable levels of sulfur and sulfur containing compounds present in the fuels used in internal combustion engines.

The U.S. EPA, for instance, has enacted regulations requiring diesel fuel producers to phase in the production of low sulfur diesel fuel (equal to or less than 15 ppm sulfur) beginning in 2006 and ending in 2010. Similarly, from 2004 to 2006, gasoline sulfur levels were reduced from 50 ppm to 30 ppm. The need for commercially available fuels having continually lower levels of sulfur containing compounds creates new problems for the manufacturers, of such fuels, i.e., the refining industry as well as the distributors and direct sellers of commercial fuels. In some cases, the refining industry may be unable to provide post refinery fuels having levels of sulfur containing compounds in accordance with recently enacted legislation. In other cases, a refinery may have produced fuel that was initially at an acceptable level but which subsequently became contaminated at some point enroute to the distributor and/or direct seller. In all such cases, the commercially available fuel may require additional removal of sulfur containing compounds.

The refining industry has used several different approaches for removing sulfur from commercially available fuel feedstocks such as gasoline and diesel.

The most common methods employed by the refinery industry for the removal of sulfur from fuels are hydrodesulfurization (HDS), Merox thiol extraction processing, and adsorption.

However, such processes continue to be unable to produce cost effective commercially available fuels that have acceptable levels of sulfur containing compounds.

Moreover, providing additional removal of sulfur containing compounds from the commercially available fuel may require the need to return the non-compliant fuel back to, for example, the refinery for reprocessing, which can be costly. Furthermore, the need for reprocessing the non-compliant fuel may cause extensive interruption to the supply of fuel to the customer.

As a result, it is now recognized that there is a need for the development of processes and apparatus capable of removing sulfur containing compounds from fuel feedstocks that have already been subjected to sulfur removing processes by the manufacturer of the fuel feedstock, i.e., a refinery. These processes and apparatus employed with regards to post refinery fuels may be referred to as 'sulfur polishing' processes and/or apparatus.

Since post refinery fuel feedstocks have reduced levels of sulfur containing compounds, such sulfur polishing technology must be capable of producing fuels having particularly low concentrations of sulfur containing fuels, i.e., less than 50 ppm and more particularly less than 15 ppm.

It would advantageous if an end user or consumer of a commercially available fuel could readily and easily provide on-the-spot fuel remediation without the need to return the fuel for reprocessing, thus reducing the cost of non-compliance and preventing extensive interruption to the supply of fuel to the customer.

It would be advantageous if sulfur-polishing technology were suitable for use in the normal fuel distribution systems employed by refineries to distribute their manufactured product. The components of such fuel distribution systems may be generally referred to as interim storage devices, i.e., above and below ground storage tanks, tanker trucks, connecting piping, metering and dispensing equipment, and the like.

It would also be especially advantageous if an end user or consumer of a commercially available fuel could readily and easily employ a sulfur polishing technology.

Accordingly, it is desirable to provide a mobile filter that provides on-the-spot fuel remediation. It is also desirable to provide a mobile filter that can filter fuel from a storage device having a holding capacity of greater than 1000 gallons. It is also desirable to provide a mobile filter unit that produces fuel streams having concentrations of sulfur containing compound of less than 15 ppm and a method for providing the same. Other desirable aspects of the present invention will become apparent with the description below.

SUMMARY OF THE INVENTION

Disclosed are fuel filters and process for removing sulfur-containing compounds from a post refinery fuel stream.

In one exemplary embodiment, a mobile fuel filter is provided. The mobile fuel filter being configured to remove sulfur-containing compounds from a diesel fuel, the mobile fuel filter comprising: a filter medium comprising an absorbent for removing sulfur-containing compounds from the diesel fuel, the filter medium being in fluid communication with a storage device, the storage device having a holding capacity greater than 1000 gallons and being configured for storing the diesel fuel, the absorbent being configured to remove sulfur containing compounds from the diesel fuel to produce a filtered diesel fuel having less than 15 ppm of sulfur containing compounds in the storage device, the absorbent comprises an inorganic oxide having a surface acidity characterized by a $pK_a$ of at least −3.

In another exemplary embodiment, a mobile fuel filter unit for removing sulfur-containing compounds from a diesel fuel is provided, the unit comprising: a filter medium comprising an absorbent for removing sulfur-containing compounds from the diesel fuel, the filter medium being in fluid communication with a storage device, the storage device having a holding capacity greater than 1000 gallons and being configured for storing the diesel fuel, the absorbent being configured to remove sulfur containing compounds from the diesel fuel to produce a filtered diesel fuel having less than 15 ppm of sulfur containing compounds, the absorbent comprises an inorganic oxide having a surface acidity characterized by a $pK_a$ of at least −3; and a pumping device in fluid communication with the filter medium and the storage device, the pumping device being configured for pumping diesel fuel from the storage device through the filter medium and back to the storage device.

In another exemplary embodiment, a method for removing sulfur-containing compounds from a diesel fuel is provided. The method comprising: passing diesel fuel from a storage device having a holding capacity greater than 1000 gallons through a mobile fuel filter unit comprising an absorbent for removing sulfur-containing compounds from the diesel fuel, the storage device being configured for storing the diesel fuel, the absorbent being configured to remove sulfur containing compounds from the diesel fuel to produce a filtered diesel fuel having less than 15 ppm of sulfur containing compounds, and the absorbent comprises an inorganic oxide having a surface acidity characterized by a $pK_a$ of at least −3.

DETAILED DESCRIPTION OF EXEMPLARY EMBODIMENTS

Figure 1:
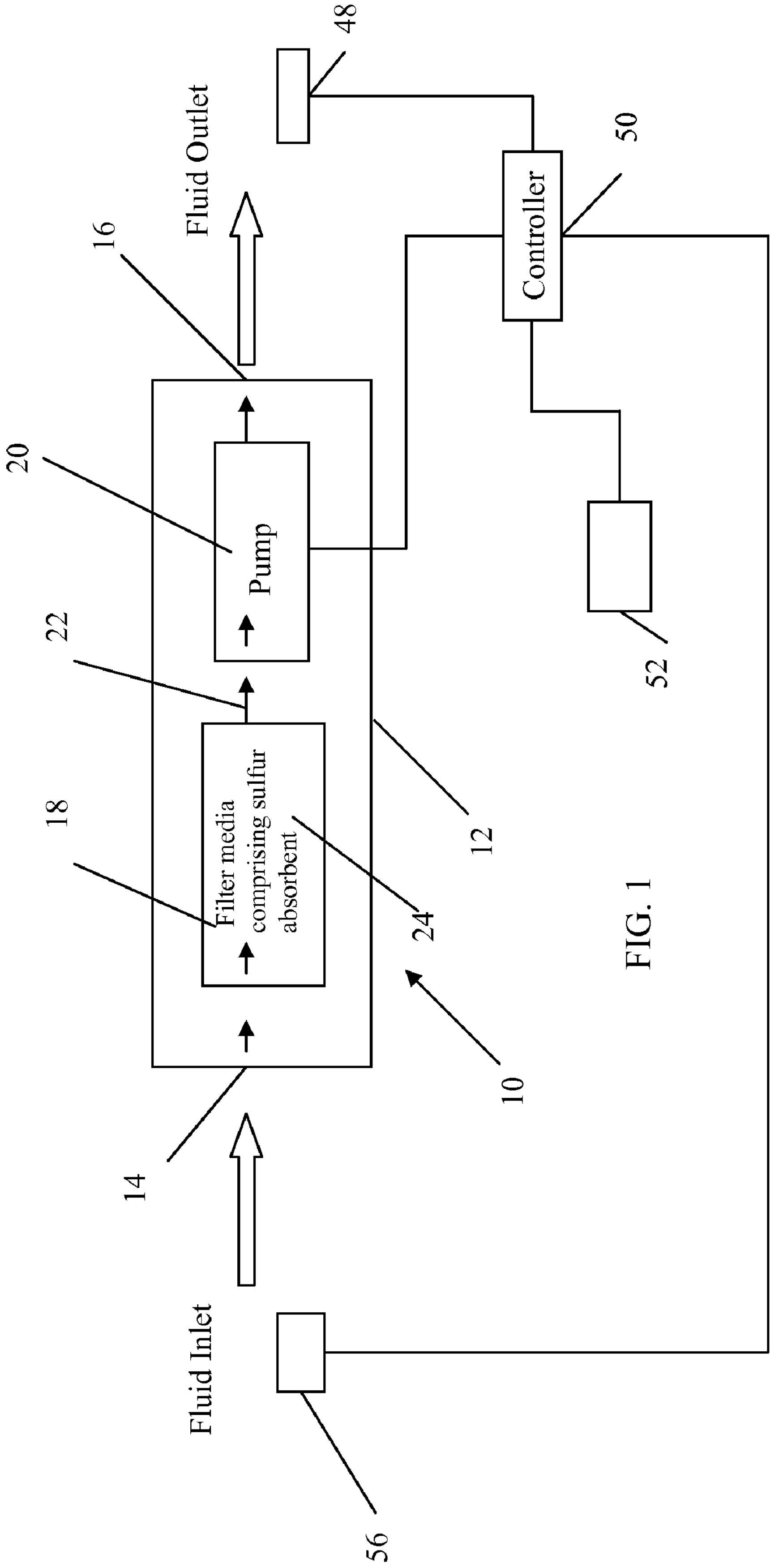
FIGS. 1-2 are schematic illustrations of fuel filters in accordance with an exemplary embodiment of the present invention.

Disclosed is a mobile fuel filter that is capable of removing sulfur containing compounds from a post refinery fuel stream.

The term "post refinery fuel stream" or "post refinery fuel" as used herein broadly refers to a fuel or fuel stream (used interchangeably herein) that is manufactured by a petroleum refinery. In one exemplary embodiment, post refinery fuel refers to a fuel manufactured by a petroleum refinery employing at least one sulfur removing technology. In one embodiment, a post refinery fuel stream will comprise sulfur containing compound(s) in a concentration of no more than 2000 ppm. In another embodiment, a post refinery fuel stream will comprise sulfur-containing compound(s) in a concentration of no more than 100 ppm. In one exemplary embodiment, a post refinery fuel stream will comprise sulfur-containing compound in a concentration of no more than 15 ppm. In one embodiment, a post refinery fuel stream contains a population of sulfur species present as various substituted alkyl, benzo, and dibenzothiophenes.

As used herein 'fuel filter' is intended to describe a fuel filter designed to remove sulfur-containing compounds found in fuels. It is understood than in accordance with exemplary embodiments a separate fuel filter may be provided to remove additional contaminants from the fuel (e.g., a typical non-sulfur removing fuel filter). Alternatively, a single fuel filter configured for both removal and release of sulfur-containing compounds and filtering of other contaminants is contemplated to be within the scope of alternative embodiments of the disclosed fuel filters and methods of using the same.

The disclosed fuel filters and methods can be used with power sources such as internal combustion engines and fuel cells employed in both stationary systems and motor vehicles. Alternatively, the disclosed fuel filters and methods can be used at any point or location in traditional fuel distribution systems that distribute post refinery fuel streams to remove sulfur containing compounds that may be undesirably present in a post refinery fuel.

Illustrative examples of internal combustion engines include gasoline powered engines and diesel engines.

The disclosed fuel filters and methods are also generally suitable for use with fuel cells having an anode, a cathode, and an electrolyte in between the two electrodes wherein typically an oxidation reaction (e.g., $H_2 \rightarrow 2H^+ + 2e^-$) takes place at the anode and a reduction reaction (e.g., $O_2 + 2H_2O + 4e^- \rightarrow 4OH^-$) takes place at the cathode.

Illustrative examples of fuel cells include Proton Exchange Membrane or Polymer Electrolyte Membrane (PEM) fuel cells, phosphoric acid (PA) fuel cells, molten carbonate (MC) fuel cells, solid oxide (SO) fuel cells, and alkaline fuel cells.

Illustrative examples of stationary systems include generators and power plants.

Illustrative examples of motor vehicles include cars, trucks, boats, personal water craft, semi-trucks, construction devices such as bulldozers and cranes, small engine devices such as lawn mowers and tractors, and the like.

In one exemplary embodiment, the fuel filter for removing or reducing concentration of sulfur containing compounds will be installed in fluid communication with a storage device having a hold capacity greater than 1000 gallons and being configured for storing the diesel fuel in accordance to one exemplary embodiment of the present invention. In such applications, the fuel filter for removing sulfur-containing compounds, i.e., a sulfur reducing or removing fuel filter may be referred to as a mobile sulfur polishing or desulphurization unit, component, or process.

In addition, the disclosed fuel filters and methods can be used at any point in traditional fuel distribution systems that distribute post refinery fuel streams.

Such fuel distribution systems may be characterized by (i) a refinery that manufactures the post refinery fuel stream and (ii) one or more interim storage devices. In another embodiment, a fuel distribution system may also include (iii) one or more fuel consuming articles or vehicles having a power source for which consumers introduce fuel. Illustrative examples of interim storage devices include underground and above ground storage tanks, tanker trucks, fuel discharge or dispensing devices, connecting piping, and the like. Fuel consuming articles or vehicles having a power source that consumes fuel include the descriptions above for motor vehicles and stationary systems.

Illustrative post-refinery fuel streams include gasoline, kerosene, heating oil, jet fuel, cracked-gasoline, or diesel fuel. In one exemplary embodiment, the fuel will be diesel fuel.

The term "gasoline" denotes a mixture of hydrocarbons boiling in the range of from about 100 degrees F. to about 400 degrees F., or any fraction thereof. Examples of suitable gasoline include, but are not limited to, hydrocarbon streams in refineries such as naphtha, straight-run naphtha, coker naphtha, catalytic gasoline, naphtha, alkylate, isomerate, reformate, and the like and combinations thereof.

The term "cracked-gasoline" denotes a mixture of hydrocarbons boiling in the range of from about 100 degrees F. to about 400 degrees F., or any fraction thereof, that are products from either thermal or catalytic processes that crack larger hydrocarbon molecules into smaller molecules. Examples of suitable thermal processes include, but are not limited to, coking, thermal cracking, visbreaking, and the like and combinations thereof. Examples of suitable catalytic cracking processes include, but are not limited to, fluid catalytic cracking, heavy oil cracking, and the like and combinations thereof. Thus, examples of suitable cracked-gasoline include, but are not limited to, coker gasoline, thermally cracked gasoline, fluid catalytically cracked gasoline, heavy oil cracked gasoline, and the like and combinations thereof.

The term "diesel fuel" denotes a mixture of hydrocarbons boiling in the range of from about 300 degrees F. to about 750 degrees F., or any fraction thereof. Examples of suitable diesel fuels include, but are not limited to, light cycle oil, kerosene, jet fuel, straight-run diesel, hydrotreated diesel, and the like and combinations thereof.

The sulfur containing compounds removed by the disclosed fuel filter may in general be any sulfur containing compound normally found in fuels intended for use in internal combustion engines. The disclosed fuel filters may remove one or more of such compounds from a fuel stream.

The term "sulfur" or "sulfur containing compound" denotes sulfur in any form such as elemental sulfur or a sulfur compound normally present in a hydrocarbon-containing fluid such as cracked gasoline or diesel fuel. Examples of sulfur which can be present during a disclosed process, include, but are not limited to, hydrogen sulfide, carbonyl sulfide (COS), carbon disulfide ($CS_2$), mercaptans (RSH), organic sulfides (R—S—R), organic disulfides (R—S—S—R), thiophene, substituted thiophenes, organic trisulfides, organic tetrasulfides, benzothiophene, alkyl thiophenes, alkylated benzothiophenes, dibenzothiophenes, alkylated dibenzothiophenes, and the like and combinations thereof as well as the heavier molecular weights of same which are normally present in a diesel fuel of the types contemplated for use in a process of the present invention, wherein each R can be an alkyl or cycloalkyl or aryl group containing one carbon atom to ten carbon atoms.

In one exemplary embodiment, the sulfur-containing compounds removed by the disclosed filter or process will be sulfur containing aromatic compounds. In one embodiment, the sulfur containing compounds removed by the disclosed fuel filter include benzothiophene, dibenzothiophene, and derivatives thereof.

In one embodiment, the disclosed fuel filters and methods are suitable for use with the interim storage devices of a traditional fuel distribution system. It will be appreciated that such methods and fuel filters may be employed at numerous locations within such interim storage devices. For example, a fuel desulfurization filter could be incorporated into the dispensing device at the point of use or at the entrance or exit of an interim storage device. In another embodiment, a fuel desulfurization filter could be incorporated at one or more central distribution points.

In yet another embodiment, the disclosed fuel filters and methods may be used to bring post refinery fuels back into compliance. That is, post refinery fuels can become contaminated at any point along the post refinery fuel distribution chain and a once compliant post refinery fuel may thereafter possess levels of sulfur containing compounds outside legally allowed limits. For example, the disclosed fuel filters and methods could be employed with mobile fuel filter trucks that could be used where needed to ensure that a post refinery fuel possesses acceptable levels of sulfur containing compounds.

The disclosed fuel filters are also suitable for use with commercially available post refinery fuels directly inserted into motor vehicles by a vehicle operator through a fuel intake opening in the vehicle. In one exemplary embodiment, the post refinery fuels will be unadulterated, that is, they will not be subject to any pretreatment steps prior to passing through the disclosed fuel filters except for those employed by the original manufacturing refinery. Such fuels may be referred to as unadulterated post refinery fuels.

Fuels or fuel streams that pass through the disclosed fuel filters and methods in any of the foregoing embodiments may be referred to as 'clean fuels', 'filtered fuels', or 'polished fuels'.

In one embodiment, an unfiltered or 'contaminated' post refinery fuel streams may comprise sulfur concentrations of greater than 15 ppm.

In one embodiment, the disclosed method will result in filtered or clean fuel streams having a reduced concentration of sulfur or sulfur containing compounds as compared to the unfiltered or contaminated post refinery fuel. In another embodiment, the disclosed method will result in filtered or clean fuel streams having reduced concentrations of sulfur or sulfur containing compounds of less than 15 ppm.

It is an aspect of the disclosed fuel filters that they comprise an adsorbent comprising an inorganic oxide having a surface acidity characterized by a $pK_a$ of at least −3. In one embodiment, the disclosed fuel filters will comprise an adsorbent consisting essentially of an inorganic oxide having a surface acidity characterized by a $pK_a$ of at least −3.

The term "inorganic oxide" as used herein refers to porous materials having pores large enough to adsorb sulfur-containing aromatic compounds.

In one embodiment, the inorganic oxides may be characterized by a surface area of at least 50 $m^2/g$, while in another embodiment, the inorganic oxides may be characterized by a surface area of from about 150 $m^2/g$ to about 500 $m_2/g$.

In one embodiment, suitable inorganic oxides will have pores in excess of 50 angstroms.

Illustrative examples of suitable inorganic oxides include alumina, kaolinite (either sodium, ammonium or hydrogen forms), montmorillonite (either sodium, ammonium or hydrogen forms), silca magnesia, alumina-boria, activated alumina, zeolites, aluminosilicates, silica gels, clay, active clay, silicon dioxide, mesoporous silica porous material (FSM), silica alumina compounds, silica, alumina phosphate compounds, super acids, super acids-sulfated, titania, sulfated zironia, titanium dioxide, hafnium oxide, and mixtures thereof and the like. In one exemplary embodiment, suitable inorganic oxides will be at least one of alumina, zeolite, silica alumina compounds, silica, alumina phosphate compounds, super acids, silica gels, titanates, zironia, titanium dioxide, hafnium oxide, and mixtures thereof.

In one especially exemplary embodiment, the inorganic oxide will be alumina. The term "alumina" as used herein refers to $Al_2O_3$.

Although many types and phases of alumina are suitable for use in the disclosed fuel filters and methods, in one embodiment, the inorganic oxide will be at least one of gamma alumina, eta alumina, and mixtures thereof. However, not withstanding the foregoing, only those inorganic oxides having a surface acidity characterized by a $pK_a$ of at least −3 are suitable for use in the disclosed fuel filters and methods.

It will be appreciated that the term "surface acidity" as used herein refers to a surface that has an acidity measurable by visual color change via an acid base indicator such as dicinnamalacetone.

In one embodiment, the disclosed fuel filters will comprise an adsorbent comprising, consisting essentially of, or consisting of, an inorganic oxide having a surface acidity characterized by a $pK_a$ of least −3. In one embodiment, the disclosed fuel filters will comprise an adsorbent comprising, consisting essentially of, or consisting of, an inorganic oxide having a surface acidity characterized by a $pK_a$ of least −6. In another embodiment, the disclosed fuel filters will comprise an adsorbent comprising, consisting essentially of, or consisting of, an inorganic oxide having a surface acidity characterized by a $pK_a$ of least −8. In another embodiment, the disclosed fuel filters will comprise an adsorbent comprising, consisting essentially of, or consisting of an inorganic oxide having a surface acidity characterized by a $pK_a$ of from about −3 to about −8. It will be appreciated the function of the adsorbent is the adsorption and removal of sulfur-containing compounds from a fuel stream.

Suitable inorganic oxides may be obtained by the calcination of an otherwise suitable inorganic oxide. In one embodiment, otherwise suitable inorganic oxides will those be inorganic oxides which lack the requisite surface acidity but which are otherwise as described above. In one exemplary embodiment, suitable inorganic oxides will be obtained by the calcination of inorganic oxides which lack the requisite surface acidity but which are otherwise as described above and which are commercially available.

In one embodiment, suitable inorganic oxides will be obtained by heating a commercially available and otherwise suitable inorganic oxide to a temperature of at least 4000° C. In another embodiment, suitable inorganic oxides will be obtained by heating an otherwise suitable and commercially available inorganic oxide to a temperature of from 400 to 800° C. In one exemplary embodiment, suitable inorganic oxides will be obtained by heating an otherwise suitable and commercially available inorganic oxide to a temperature of from 400 to 450° C. under a flow of nitrogen. After preparation, the sorbent may be stored under dry nitrogen until use.

It will be appreciated that the disclosed absorbents may in one embodiment comprise metals and metal oxides such as Group VIIIA metals, Group IVA, Group IVB and the like.

However, in one embodiment, the disclosed adsorbents may optionally be untreated with any metals or metal oxides other than those discussed above in the context of inorganic oxides. That is, in one embodiment, the disclosed adsorbents will consist essentially of the inorganic oxide having a surface acidity characterized by a $pK_a$ of at least −3. In another exemplary embodiment, the disclosed adsorbents will consist essentially of an inorganic oxide having a surface acidity characterized by a $pK_a$ of at least −3 and that is substantially free of the metals and metal oxides traditionally employed as desulfurization catalysts or absorbents. In another exemplary embodiment, the disclosed adsorbents will consist essentially of an inorganic oxide having a surface acidity characterized by a $pK_a$ of at least −3 and that is substantially free of the metals and metal oxides such as Group VIIIA metals, Group IVA, Group IVB and the like.

Referring now to FIG. 1, a non-limiting example of a fuel filter 10 in accordance with an exemplary embodiment of the present invention is illustrated. In accordance with an exemplary embodiment, fuel filter 10 is a diesel fuel filter. In one exemplary embodiment, fuel filter 10 is a stand-alone portable or mobile fuel filter configured to provide on-the-spot fuel remediation. In one exemplary embodiment, fuel filter 10 comprises a housing 12 configured to have a fluid inlet 14 and a fluid outlet 16 for fuel to therethrough.

In one exemplary embodiment, fuel filter 10 includes a filter media or median 18 comprising the aforementioned adsorbents that are configured to filter fuel in accordance with known technologies.

In one exemplary embodiment, fuel filter 10 includes a pump 20 configured to circulate fuel through filter media 18 for filtering. The pump is in fluid communication with filter media 18 in accordance to one exemplary embodiment of the present invention. In one exemplary embodiment, pump 20 is secured within housing 12 such that a flow path is formed, which is indicated by arrow 22 in FIG. 1.

In accordance with an exemplary embodiment of the present invention media 18 comprises or is an absorbent material 24 that is positioned in the flow path to filter the fuel, namely remove sulfur from the fuel. Non-limiting examples of absorbent material 24 are found in U.S. patent application Ser. No. 11/674,913, filed Feb. 14, 2007, the contents of which are incorporated herein by reference.

Figure 2:
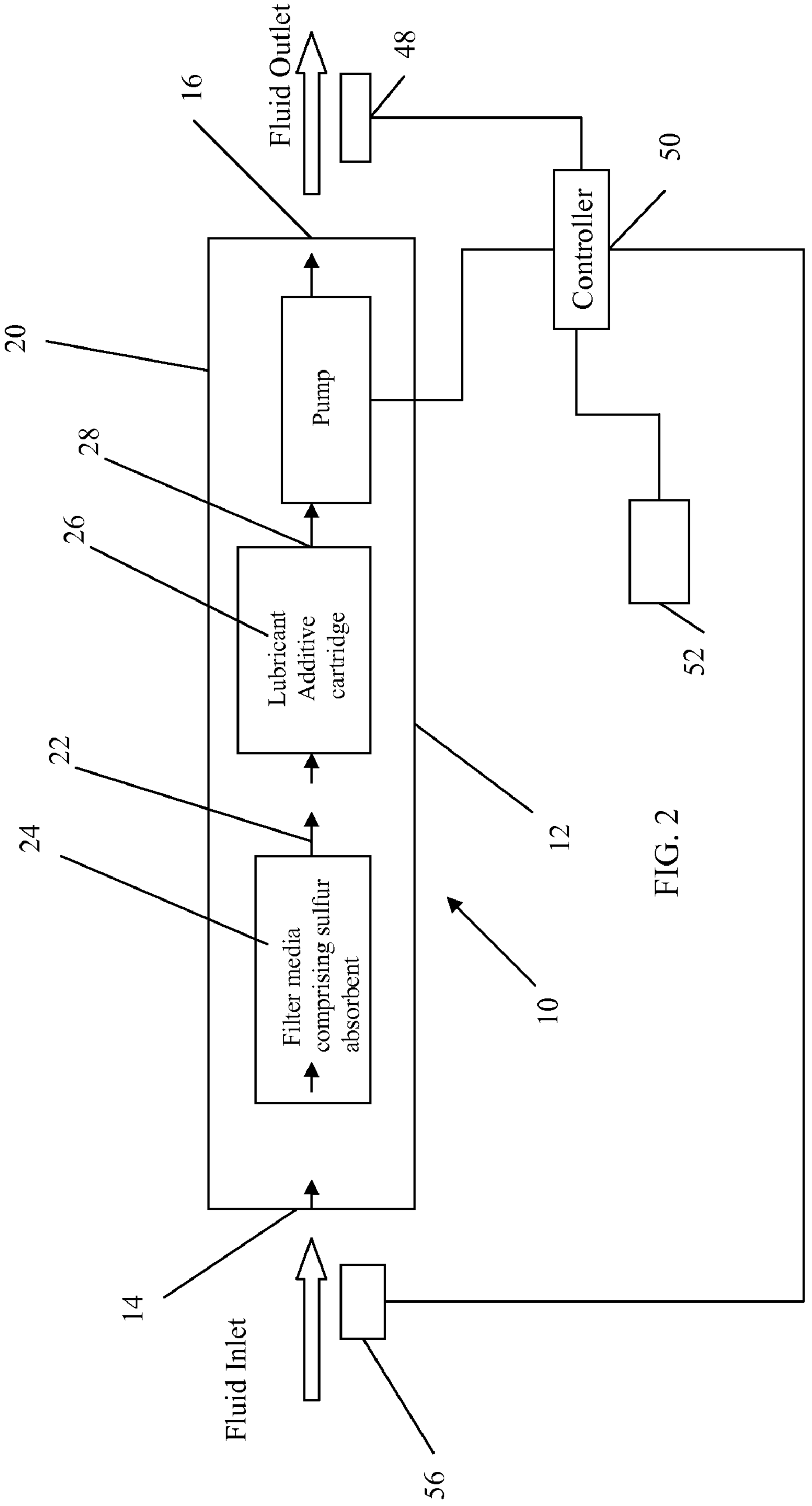

Optionally and referring to FIG. 2, an additive cartridge 26 can be positioned in the flow path to disperse a lubricity additive 28 into the fuel after the fuel has been filtered by absorbent material 24 such that the lubricant or lubricity additive is not scrubbed from the fuel in accordance with one exemplary embodiment of the present invention. Non-limiting examples of additive cartridge 26 are found in U.S. patent application Ser. No. 11/864,962, filed Sep. 29, 2006, the contents of which are incorporated herein by reference.

Figure 3:
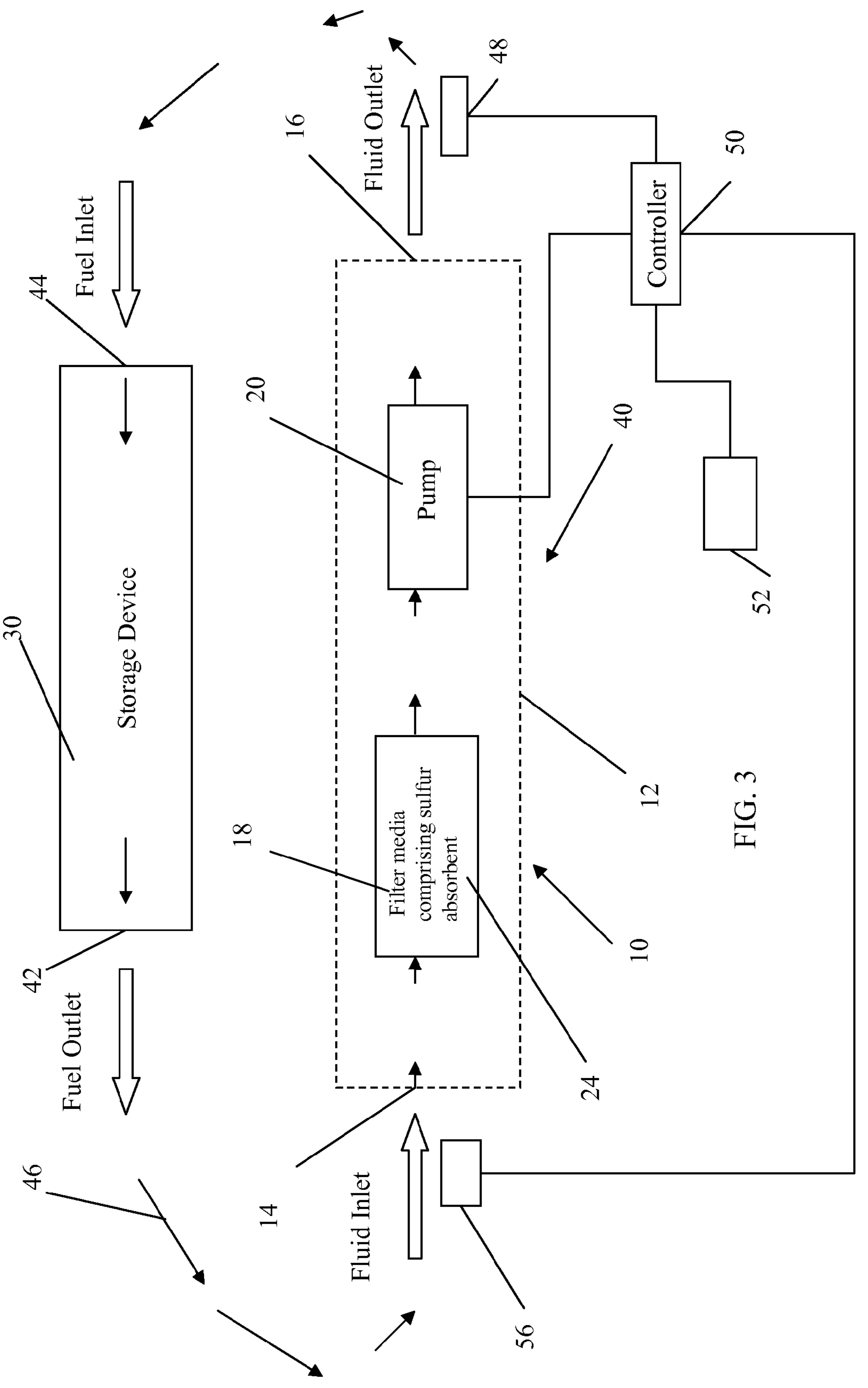
FIG. 3 is a schematic illustration of a filtering system in accordance with an exemplary embodiment of the present invention.

In one exemplary embodiment, fuel filter 10 is employed with a storage device 30 forming a filtering system 40 as illustrated in FIG. 3. In one exemplary embodiment, storage device 30 is in fluid communication with fuel filter 10 as shown. The storage device 30 comprises a fuel outlet 42 and a fuel inlet 44 for fuel to flow therethrough in accordance to one exemplary embodiment of the present invention. In one exemplary embodiment, fuel outlet 42 is fluidly connected to fluid inlet 14 of fuel filter 10 and fuel inlet 44 is fluidly connected to fluid outlet 16 of fuel filter 10.

In accordance with an exemplary embodiment of the present invention the storage device may be any one of an above ground fuel storage tank, an underground fuel storage tank, a fuel tanker truck, a filter truck, or a fuel dispensing device. In addition, and in accordance with an exemplary embodiment of the present invention the fuel filter can be located on a truck or any other device or vehicle capable of bringing the mobile filter unit is close proximity to the storage device. One non-limiting example is a mobile filter truck that can be driven to a fuel station or fuel depot wherein the mobile filter truck is then fluidly connected to fuel at the fuel station or fuel depot and then the mobile filter truck is used to bring the sulfur content of the fuel down below 15 ppm. Alternatively, the fuel storage tank is mobile (e.g., tanker truck) and the same is fluidly coupled to a stationary or mobile filter truck and the fuel in the tanker truck is filtered until at least a level of 15 ppm is achieved.

In one exemplary embodiment, storage device 30 has a holding capacity approximately greater than 1000 gallons. In another exemplary embodiment, storage device 30 has a holding capacity approximately greater than 1 million gallons. In yet another exemplary embodiment, storage device 30 has a holding capacity approximately between 1 million gallons to 8.4 million gallons.

In operation, pump 20 of fuel filter 10 pumps fuel from storage device 30 through filter media 18 and back into storage device 30 in accordance to one exemplary embodiment of the present invention. As such, fuel flows through fuel outlet 42 and into fluid inlet 14, through filter media 18 for filtering, and out through fluid outlet 16 and into fuel inlet 44 returning fuel back into storage device 30 in filtered form. Consequently, a continuous fluid path is formed, indicated by arrows 46 in FIG. 3. In this case, non-compliant fuel from storage device 30 can be reprocessed on the spot using mobile fuel filter 10. In one exemplary embodiment, the non-compliant fuel in storage device 30 is passed through filter media multiple times to reach a desired concentration of a sulfur-containing compound in the fuel.

During the normal operation of fuel filter 10, the concentration of a sulfur-containing compound in the "clean" fuel exiting fluid outlet 16 of fuel filter 10 will be less than the concentration of the sulfur-containing compound in the "contaminated" or "non-compliant" fuel entering fluid inlet 14 from storage device 30. In accordance to one exemplary embodiment, storage device 30 stores fuel or non-compliant fuel having greater than 15 ppm of sulfur-containing compounds. In one exemplary embodiment, such fuel after passing through filter media 18 has less than 15 ppm of sulfur-containing compounds, which in accordance to one exemplary embodiment is the "clean" fuel.

In one exemplary embodiment, storage device 30 includes a pump (not shown) configured for circulating fuel from storage device 30 to fuel filter 10. The pump of storage device 30 could be employed together with pump 20 of fuel filter 10 for circulating fuel between storage device 30 and fuel filter 10. Alternatively, the pump of storage device 30 can be the only pump employed in filtering system 40 for circulating fuel from storage device 30 to fuel filter 10, thus eliminating the need for pump 20 of fuel filter 10. It is also contemplated that a pump can be located anywhere along the flow path between storage device 30 and fuel filter 10.

In one exemplary embodiment, pump 20 of fuel filter 10 operates to pump fuel at a flow rate of approximately 500 gallons per minute. As such, for example, pumping a 1 million gallon storage tank at 500 gallons per minute would take fuel filter 10 about thirty-four hours to filter the contaminated fuel from the storage tank. In another example, pumping a 8.4 million gallon storage tank at 500 gallons per minute would take fuel filter 10 slightly over a week to filter 8.4 million gallons of contaminated fuel from the storage tank. Of course, pump 20 can operate to pump fuel at various flow rates depending on the application and should not be limited to the example set forth above, thus decreasing or increasing the operating time of fuel filter 10. Furthermore, the amount of time fuel filter 10 needs to be operating will depend on the desired ppm level, the efficiency of the adsorbent and the capacity of the pump and/or fluid conduits connecting the fuel filter to the storage tank. It should be understood that the pump of storage device 30 is configured to similarly operate at the flow rate described above for pump 20 of fuel filter 10.

In one exemplary embodiment, pump 20 of fuel filter 10 pumps fuel from storage device 30 through filter media 18 comprising adsorbent 24 and into another storage device different from storage device 30. Here unfiltered fuel is pumped from one storage tank to another storage tank thus, ensuring all of the fuel is passed through the filter once.

In addition to the disclosed fuel filter, exemplary embodiments of the present invention provide a method for removing sulfur-containing compounds from a diesel fuel. In one exemplary embodiment, the method comprises removing sulfur-containing compounds from a diesel fuel by passing the fuel from storage device 30 having a holding capacity greater than 1000 gallons through fuel filter 10 to produce filtered diesel fuel having less than 15 ppm of sulfur containing compounds.

In another embodiment, the disclosed methods and processes may further comprise pumping diesel fuel filtered by the fuel filter 10 back into storage device 30 forming a continuous fluid flow between storage device 30 and fuel filter 10.

In accordance with an exemplary embodiment of the present invention the level of the sulfur-containing compounds in the filtered fuel is measured by a sensor 48 in fluid communication with the filtered fuel outlet wherein the sensor provides a signal indicative of the sulfur content of the filtered fuel. In one exemplary embodiment, the signal is provided to a controller or micro-controller 50 that is capable of controlling the operation of the pump. In other words, and when the sulfur content is below a desirable level for a predetermined time period indicating that the fuel in the storage device is at a desired level the controller can send a signal to the pump instructing the same to shut off. Furthermore, the controller can send a signal to a remote operator indicating that the filtering process is complete.

Alternatively, the controller will comprise an algorithm capable of predicting when the filter has pumped enough fuel therethough to achieve a desired sulfur level. For example, known variables (e.g., size of storage device, flow rate of the pump and fuel filter, etc.) are inputted into the controller via a user input device 52 and in this embodiment, the filtering capacity of the media or adsorbent is known such that for example, running the pump at X gallons per minute for Y hours will cause a storage device of Z gallons to be at a sulfur level less than Q ppm. In one exemplary embodiment, Q ppm is 15 ppm of course, other levels are contemplated to be within the scope of exemplary embodiments of the present invention. Here, the operator simple inputs the size of the storage tank and desired ppm into an algorithm and the controller will provide a minimum amount of operation at a given flow rate to provide a reliable probability that the filtered fuel will be at the desired ppm. User input device 52 may further comprise a graphic display or means for signaling (e.g., RF, Infrared, electrical, etc.) a remote operator that the desired ppm has been achieved.

In yet another alternative, the two previous modes of operation are combined and the algorithm works in conjunction with sensor 48 and the time to the desired ppm may be varied based upon the sampled sulfur content for a given period of time.

In yet another alternative, a sensor 56 can be positioned at the inlet before the filter media or adsorbent in order to provide a sulfur content of the fuel entering the filter. In this embodiment, the signals of sensors 48 and 56 can be used to determine the effectiveness of the filter media or adsorbent in order to vary the time period for achieving the desired ppm (e.g., filter becomes less efficient thus operating time may become longer) or alternatively, shut the system down for replacement of regeneration of the filter media (e.g., filter no longer reducing the content of the filtered fuel).

In accordance with an exemplary embodiment of the present invention, a sulfur-containing compound is removed from a fuel stream as the fuel is passed through fuel filter 10. In one exemplary embodiment, the sulfur-containing compound is removed as the fuel is passed through filter media 18 comprising the disclosed absorbents as discussed above.

In one embodiment, the sulfur-containing compounds removed from a fuel stream by the disclosed fuel filter will be stored by the adsorbent of the fuel filter. In one exemplary embodiment, the removed sulfur-containing compounds will be stored in the filter media comprising the disclosed absorbent.

It will be appreciated that the disclosed fuel filter will remove a quantity of sulfur containing compounds from the fuel stored in the storage device.

In one embodiment, at some point, the adsorbent may become incapable of storing any additional sulfur-containing compound even though additional storage is desired. At such a point, the disclosed fuel filter may be regenerated, recycled, or discarded prior to reuse. Regeneration of the fuel filter as used herein refers to the release of at least a portion of the stored sulfur-containing compound, i.e., desulfation. Such release or regeneration may be accomplished by applying heat to the adsorbent.

It will be appreciated throughout this discussion that the singular forms "a", "an" and "the" include plural referents unless the context clearly dictates otherwise. Similarly, throughout "optional" or "optionally" means that the subsequently described event or circumstance may or may not occur, and that the description includes instances where the event occurs and instances where it does not. Likewise, the modifier "about" used in connection with a quantity is inclusive of the stated value and has the meaning dictated by the context (e.g., includes the degree of error associated with measurement of the particular quantity).

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A mobile fuel filter for removing sulfur-containing compounds from a diesel fuel, the mobile fuel filter comprising:

a filter medium comprising an absorbent for removing sulfur-containing compounds from the diesel fuel, the filter medium being in fluid communication with a storage device, the storage device having a holding capacity greater than 1000 gallons and being configured for storing the diesel fuel, the absorbent being configured to remove sulfur containing compounds from the diesel fuel to produce a filtered diesel fuel having less than 15 ppm of sulfur containing compounds in the storage device, the absorbent comprises an inorganic oxide having a surface acidity characterized by a $pK_a$ of at least −3; and a sensor in fluid communication with fuel filtered by the filter medium, the sensor providing a signal when the fuel filtered by the filter medium has sulfur containing compounds below a predetermined value.

2. The mobile fuel filter as in claim 1, wherein the storage device includes a pump for pumping the diesel fuel from the storage device through the filter medium and back into the storage device and the pump is responsive to the signal.

3. The mobile fuel filter as in claim 2, wherein the pump is integral with the storage device.

4. The mobile fuel filter as in claim 2, wherein the pump is integral with the fuel filter.

5. The mobile fuel filter as in claim 2, wherein the pump pumps diesel fuel from the storage device to the filter medium at a flow rate up to at least approximately 500 gallons per minute.

6. The mobile fuel filter as in claim 1, wherein the holding capacity of the storage device is greater than 1 million gallons.

7. The mobile fuel filter as in claim 1, wherein the holding capacity of the storage device is greater than 8.4 million gallons.

8. The mobile fuel filter as in claim 1, wherein the storage device is at least one of an above ground fuel storage tank, an underground fuel storage tank, a fuel tanker truck, a filter truck, or a fuel dispensing device.

9. The mobile fuel filter of as in claim 1, wherein the inorganic oxide is characterized by a surface that is substantially free of applied compounds comprising Group VIIIA metals, Group IVmetals, alkali metals, alkaline earth metals, and mixtures thereof.

10. The mobile fuel filter as in claim 1, wherein the inorganic oxide is substantially free of compounds comprising Group VIIIA metals, alkali metals, alkaline earth metals, and mixtures thereof.

11. The mobile fuel filter as in claim 1, wherein the inorganic oxide is at least one of alumina, kaolinite (either sodium, ammonium or hydrogen forms), montmorillonite (either sodium, ammonium or hydrogen forms), silca magnesia, alumina-boria, activated alumina, zeolites, aluminosilicates, silica gels, clay, active clay, silicon dioxide, mesoporous silica porous material (FSM), silica alumina compounds, silica, alumina phosphate compounds, super acids, super acids-sulfated, titania, sulfated zironia, titanium dioxide, hafnium oxide, and mixtures thereof.

12. The mobile fuel filter as in claim 1, wherein the inorganic oxide is selected from the group consisting of gamma, eta, or chi alumina.

13. A mobile fuel filter unit for removing sulfur-containing compounds from a diesel fuel, the unit comprising:

a filter medium comprising an absorbent for removing sulfur-containing compounds from the diesel fuel, the filter medium being in fluid communication with a storage device, the storage device having a holding capacity greater than 1000 gallons and being configured for storing the diesel fuel, the absorbent being configured to remove sulfur containing compounds from the diesel fuel to produce a filtered diesel fuel having less than 15 ppm of sulfur containing compounds, the absorbent comprises an inorganic oxide having a surface acidity characterized by a $pK_a$ of at least −3;

a sensor in fluid communication with fuel filtered by the filter medium, the sensor providing a signal when the fuel filtered by the filter medium has sulfur containing compounds below a predetermined value; and a pumping device in fluid communication with the filter medium and the storage device, the pumping device being configured for pumping diesel fuel from the storage device through the filter medium and back to the storage device, wherein the pump is responsive to the signal from the sensor.

14. The mobile fuel filter as in claim 13, wherein the pumping device pumps diesel fuel from the storage device to the filter medium at a flow rate up to at least approximately 500 gallons per minute.

15. The mobile fuel filter as in claim 13, wherein the pumping device provides a continuous fluid flow between the storage device and the filter medium.

16. The mobile fuel filter as in claim 13, wherein the holding capacity of the storage device is greater than 1 million gallons.

17. The mobile fuel filter as in claim 13, wherein the holding capacity of the storage device is greater than 8.4 million gallons.

18. The mobile fuel filter unit as in claim 13, wherein the storage device is at least one of an above ground fuel storage tank, an underground fuel storage tank, a fuel tanker truck, a filter truck, or a fuel dispensing device.

19. A method for removing sulfur-containing compounds from a diesel fuel, the method comprising:

passing diesel fuel from a storage device having a holding capacity greater than 1000 gallons through a mobile fuel filter unit comprising an absorbent for removing sulfur-containing compounds from the diesel fuel, the storage device being configured for storing the diesel fuel, the absorbent being configured to remove sulfur containing compounds from the diesel fuel to produce a filtered diesel fuel having less than 15 ppm of sulfur containing compounds, and the absorbent comprises an inorganic oxide having a surface acidity characterized by a $pK_a$ of at least −3; and sensing sulfur containing compounds in the diesel fuel filtered by the mobile fuel filter unit with a sensor in fluid communication with the diesel fuel filtered by the mobile fuel filter unit, the sensor providing a signal when the diesel fuel filtered by the mobile fuel filter unit has sulfur containing compounds below a predetermined value.

20. The method as in claim 19, wherein a pump in fluid communication with the filter medium and the storage device passes the diesel fuel from the storage device through the filter medium back to the storage device, the pump being responsive to the signal.

21. The method as in claim 19, wherein the diesel fuel passes from the storage device through the mobile fuel filter unit at a flow rate up to at least approximately 500 gallons per minute.

22. The mobile fuel filter as in claim 19, wherein the holding capacity of the storage device is greater than 1 million gallons and the storage device is at least one of an above ground fuel storage tank, an underground fuel storage tank, a fuel tanker truck, a filter truck, or a fuel dispensing device.

* * * * *